United States Patent
Koya et al.

(10) Patent No.: US 8,239,049 B2
(45) Date of Patent: Aug. 7, 2012

(54) PLAYING STATE PRESENTATION SYSTEM, PLAYING STATE PRESENTATION DEVICE, PLAYING STATE PRESENTATION METHOD, AND PLAYING STATE PRESENTATION PROGRAM

(75) Inventors: Takashi Koya, Kanagawa (JP);
Taketeru Fujimoto, Kanagawa (JP);
Shigetaka Kudo, Kanagawa (JP);
Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1555 days.

(21) Appl. No.: 11/713,641

(22) Filed: Mar. 5, 2007

(65) Prior Publication Data

US 2007/0237036 A1 Oct. 11, 2007

(30) Foreign Application Priority Data

Mar. 9, 2006 (JP) ................. 2006-064588

(51) Int. Cl.
*G06F 17/00* (2006.01)
*G06F 15/173* (2006.01)
*G06F 3/00* (2006.01)
*G06F 5/00* (2006.01)
*H04B 7/00* (2006.01)

(52) U.S. Cl. ............ 700/94; 709/224; 710/57; 455/41.3

(58) Field of Classification Search .................. 700/94; 709/216, 219, 224, 230–234; 710/20, 29, 710/52–61; 455/3.06, 421, 41.2, 41.3
See application file for complete search history.

(56) References Cited

U.S. PATENT DOCUMENTS

| 6,247,072 | B1 * | 6/2001 | Firestone ................ 710/57 |
| 7,391,717 | B2 * | 6/2008 | Klemets et al. ........... 370/216 |
| 2002/0018057 | A1 | 2/2002 | Sano |
| 2006/0176827 | A1 * | 8/2006 | Lehew et al. ............ 370/252 |
| 2007/0002846 | A1 * | 1/2007 | Rada et al. ............. 370/358 |
| 2007/0180106 | A1 * | 8/2007 | Pirzada et al. ........... 709/224 |

FOREIGN PATENT DOCUMENTS

| JP | 2002-44036 | 2/2002 |
| JP | 2002-44092 | 2/2002 |
| JP | 2004-228622 | 8/2004 |

* cited by examiner

*Primary Examiner* — Jesse Elbin
(74) *Attorney, Agent, or Firm* — Finnegan Henderson Farabow Garrett & Dunner LLP (57) ABSTRACT

A playing state presentation system has a contents server for supplying consecutive contents data, and a contents playing device for obtaining and playing the contents data. The contents playing device includes: a reception unit for receiving the contents data from the contents server by wireless communication; a supplying unit for supplying the contents data to a playing unit which successively plays the contents data received by the reception unit, with the contents data being supplied at a supply speed unique to the contents data; a playing state prediction unit for predicting whether or not the contents data can be continuously played at the playing unit, as a playing state; and a presentation unit for presenting the predicted playing state.

13 Claims, 7 Drawing Sheets

PLAYING STATE PRESENTATION SYSTEM, PLAYING STATE PRESENTATION DEVICE, PLAYING STATE PRESENTATION METHOD, AND PLAYING STATE PRESENTATION PROGRAM

CROSS REFERENCES TO RELATED APPLICATIONS

The present invention contains subject matter related to Japanese Patent Application JP 2006-064588 filed in the Japanese Patent Office on Mar. 9, 2006, the entire contents of which are incorporated herein by reference.

BACKGROUND OF THE INVENTION

1. Field of the Invention

The present invention relates to a playing state presentation system, a playing state presentation device, a playing state presentation method, and a playing state presentation program, suitably applied to an audio player device which receives and plays streamed audio data, for example.

2. Description of the Related Art

Audio players have been proposed wherein the audio player receives audio data streamed from a server device storing the audio data via a wireless network, sequentially converts the audio data into audio, and outputs the audio.

Now, with wireless networks used for distributing the audio contents for the audio layers, the wireless communication itself cannot be visually recognized by the user, and accordingly an arrangement can be conceived wherein display marks or the like are displayed in accordance with the state of wireless communication on predetermined display units or the like of the equipment having wireless networking functions, thereby enabling the user to recognize the state.

For example, a proposal has been made, in Japanese Unexamined Patent Application Publication No. 2004-228622 (page 10, FIG. 9) for example, wherein, with a personal computer having wireless network functions, a display pattern of a display mark (icon) is changed according to the strength of detected airwaves, error rate values, or the like.

SUMMARY OF THE INVENTION

Now, with such audio players, whether or not the audio data can ultimately be played without cutting out (hereafter referred to as "playing state") is more important information than detailed wireless network state information, so the user should be presented with this playing state.

However, with the above-described audio player, even changing the display pattern of the icon in accordance with the strength of airwaves of the wireless network, error rate values, or so forth, only provides the user with reference information regarding the playing state, so the playing state cannot be directly presented to the user, and the user has not been able to know whether or not the audio data playing is going to cut out.

Accordingly, there has been a need to address the above problem. Embodiments of the present invention provide for a playing state presentation system, a playing state presentation device, a playing state presentation method, and a playing state presentation program, wherein the playing state of contents over a wireless network can be directly presented.

According to an embodiment of the present invention, there is provided a playing state presentation system having a contents server for supplying consecutive contents data, and a contents playing device for obtaining and playing the contents data; the contents playing device comprising: reception means for receiving the contents data from the contents server by wireless communication; supplying means for supplying the contents data to a playing unit which successively plays the contents data received by the reception means, with the contents data being continuously supplied at a supply speed unique to the contents data; playing state prediction means for predicting whether or not the contents data can be continuously played at the playing unit, as a playing state; and presentation means for presenting the predicted playing state.

Accordingly, a playing state can be presented which has been predicted taking into consideration the supply speed of the contents data to the playing unit, in addition to the reception speed of the contents data over the wireless network.

Also, according to another embodiment of the present invention, there is provided a playing state presentation device, a playing state presentation method, and a playing state presentation program, wherein consecutive contents data is received from a predetermined contents server by wireless communication; the contents data is continuously supplied to a playing unit which successively plays the contents data received by the reception means, with the contents data being supplied at a supply speed unique to the contents data; whether or not the contents data can be continuously played at the playing unit is predicted as a playing state; and the predicted playing state is presented.

Accordingly, a playing state can be presented which has been predicted taking into consideration the supply speed of the contents data to the playing unit, in addition to the reception speed of the contents data over the wireless network.

Further, according to another embodiment of the present invention, there is provided a playing state presentation device, a playing state presentation method, and a playing state presentation program, wherein contents data is received from a predetermined contents server by wireless communication; the contents data is supplied to a playing unit which successively plays the contents data received by the reception means, with the contents data being continuously supplied at a supply speed unique to the contents data; prediction techniques for predicting whether or not the contents data can be continuously played at the playing unit, as a playing state, are switched over, according to whether or not the contents data is being played; the playing state by the switched-over prediction technique is predicted; and the predicted playing state is presented.

Accordingly, a playing state can be presented which has been predicted taking into consideration the supply speed of the contents data to the playing unit, in addition to the reception speed of the contents data over the wireless network, following a prediction technique according to whether or not the contents data is being played.

Thus, embodiments of the present invention provide for a playing state presentation system, a playing state presentation device, a playing state presentation method, and a playing state presentation program, wherein a playing state can be presented which has been predicted taking into consideration the supply speed of the contents data to the playing unit, in addition to the reception speed of the contents data over the wireless network, and the playing state of contents over a wireless network can be directly presented.

DESCRIPTION OF THE PREFERRED EMBODIMENTS

An embodiment of the present invention will now be described in detail, with reference to the drawings.

(1) Configuration of Audio System

Figure 1:
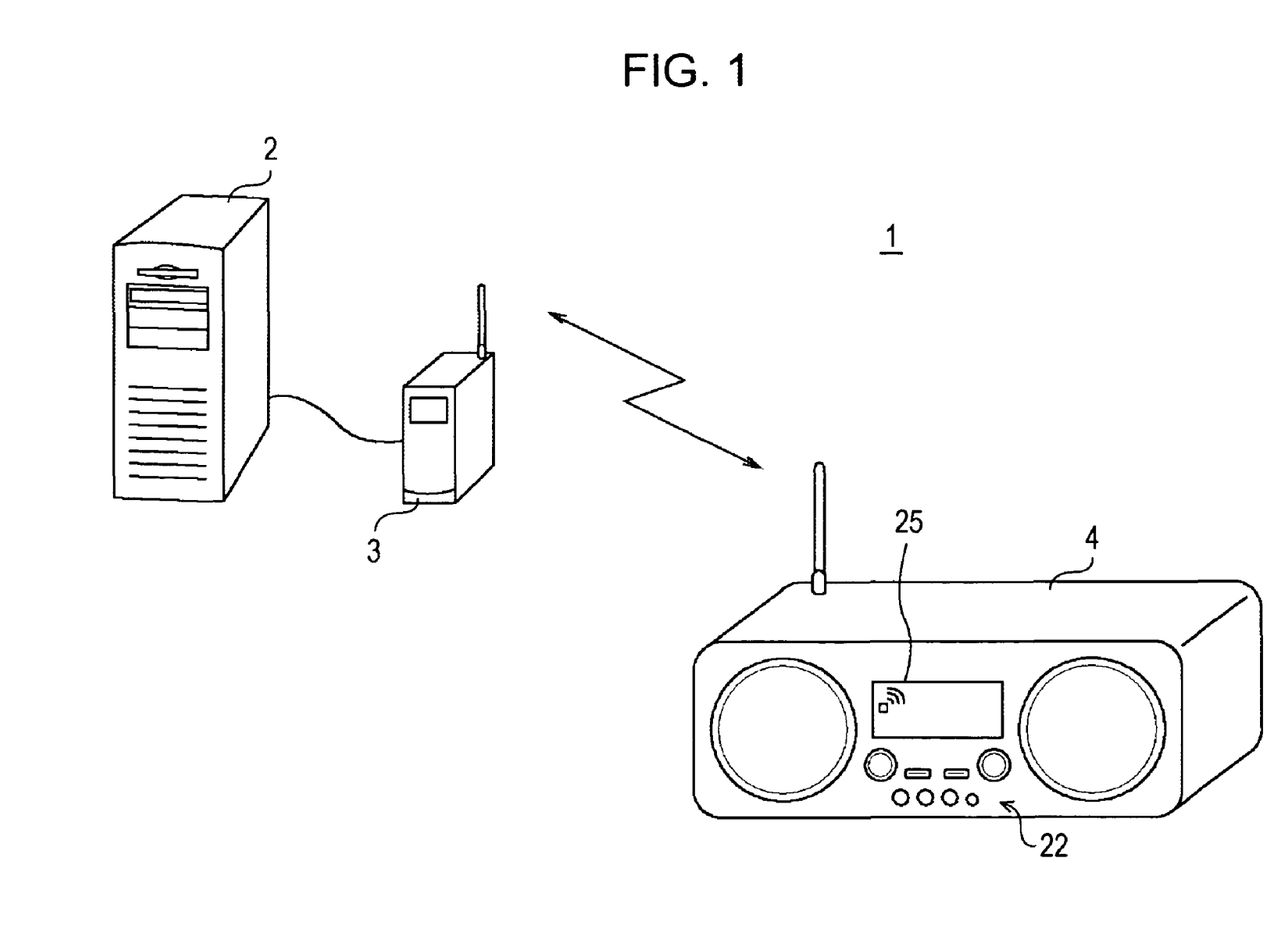
FIG. 1 is a schematic diagram illustrating the overall configuration of an audio system.

In FIG. 1, reference numeral 1 denotes an overall audio system, which is configured of a server 2 storing a great amount of audio data, this server 2 transmitting audio data upon a request being made thereto, an access point 3 for converting audio data transmitted from the server 2 into wireless signals, and an audio player 4 for receiving audio data in the from of the wireless signals from the access point 3 and successively playing the received audio data.

(1-1) Server Circuit Configuration

Figure 2:
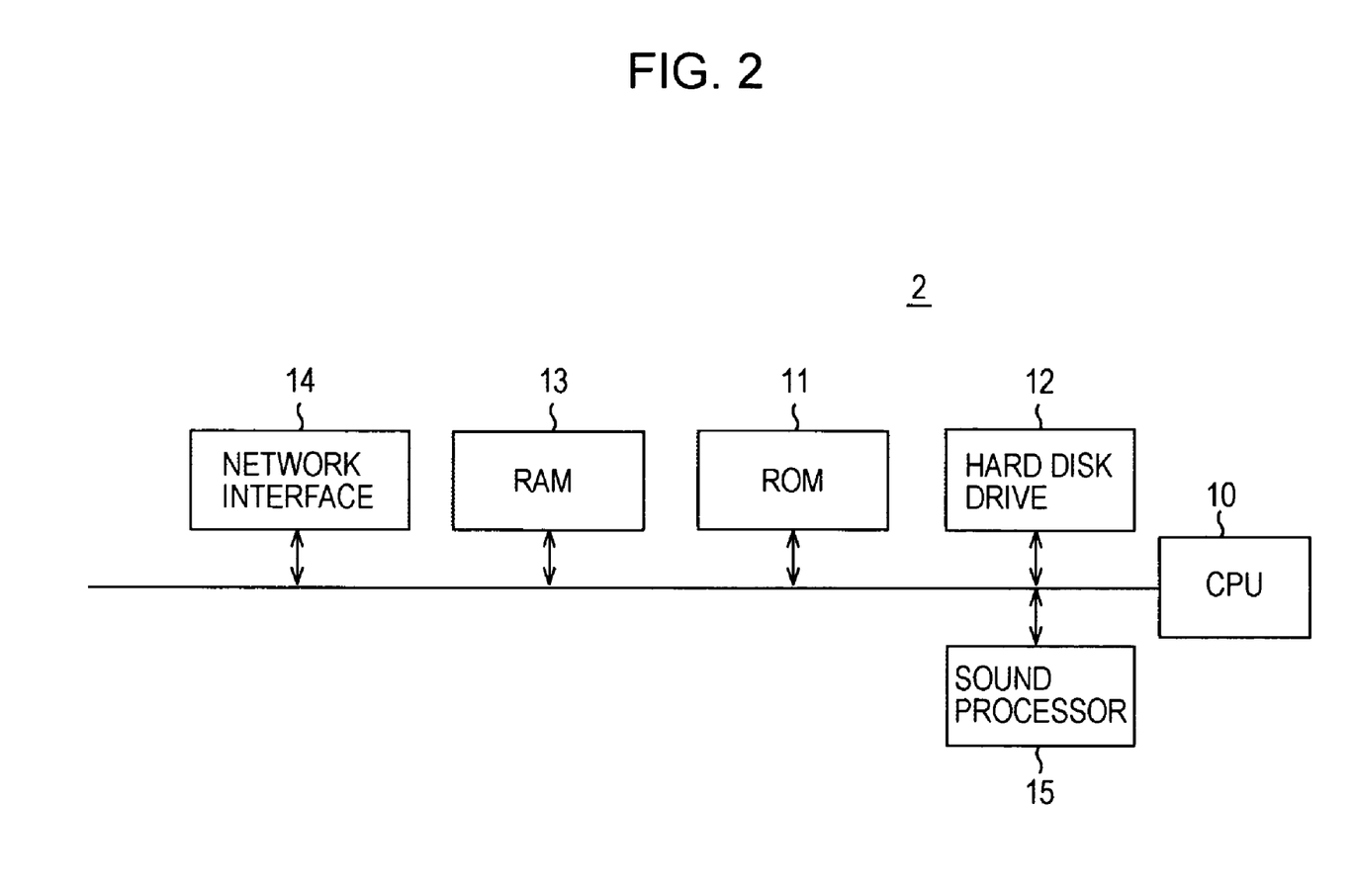
FIG. 2 is a block diagram illustrating the circuit configuration of a server.

FIG. 2 illustrates a circuit configuration of the server 2. The server 2 is centrally controlled by a CPU 10, and is arranged so as to be capable of various types of processing such as transmission of audio data and so forth, by loading and executing basic programs and other various types of programs read out from ROM (Read Only Memory) 11 or a hard disk drive 12 to RAM (Random Access Memory) 13. The CPU 10 also temporarily stores data used in such processing in the RAM 13.

A network interface 14 is connected to the access point 3 (FIG. 1) by cable, and subjects the various types of data supplied from the CPU 10 and RAM 13 to data format conversion processing such as converting into packets, and then sends the converted data on to the access point 3. In the same way, the network interface 14 extracts data from packets supplied from the access point 3, and sends data thus or otherwise obtained to the CPU 10 or RAM 13.

In actual practice, upon the CPU 10 receiving a list request signal requesting a list of audio data, from the audio player 4 via the access point 3 for example, the CPU 10 supplies a list of audio data stored in the hard disk drive 12 to the network interface 14, and thus the list is sent from the access point 3 to the audio player 4, in response to the list request signal.

Note that this list is generated at the time of storing audio data in the hard disk drive 12 for example, and is stored in the hard disk drive 12.

Also, upon receiving an audio data request signal requesting audio data from the audio player 4 via the access point 3 following transmitting the list, the CPU 10 reads out the audio data specified in the audio data request signal from the hard disk drive 12. Note that the audio data stored in the hard disk drive 12 has been subjected to compression encoding.

The CPU 10 subjects the audio data that is read out to digital processing such as decoding processing with a sound processor 15, and then supplies the audio data subjected to the digital processing to the network interface 14, thereby sending the audio data to the audio player 4 via the access point 3. Now, the audio data subjected to digital processing at the sound processor 15 is in the linear PCM (Pulse Code Modulation) format for example, and this linear PCM audio data is transmitted to the audio player 4.

Thus, the server 2 wirelessly transmits a list of audio data stored on the hard disk drive 12, and audio data subjected to predetermined digital processing, via the access point 3, in response to requests from the audio player 4.

(1-2) Configuration of Access Point

The access point 3 has a cable LAN (Local Area Network) interface compliant to a cable LAN standard such as IEEE (Institute of Electrical and Electronics Engineers) 802.3 or the like, for example, and is configured so as to be capable of cable communication with the server 2.

Also, the access point 3 has a wireless LAN interface compliant to a wireless LAN standard such as IEEE 802.11a/b/g or the like, for example, and is configured so as to be capable of wireless communication with the audio player 4.

In actual practice, the access point 3 transmits by wireless LAN the data (packets) received via the cable LAN, and transmits by cable LAN the data (packets) received via the wireless LAN, thereby performing relay processing between cable LAN network communication and wireless LAN network communication.

(1-3) Audio Player Circuit Configuration

Figure 3:
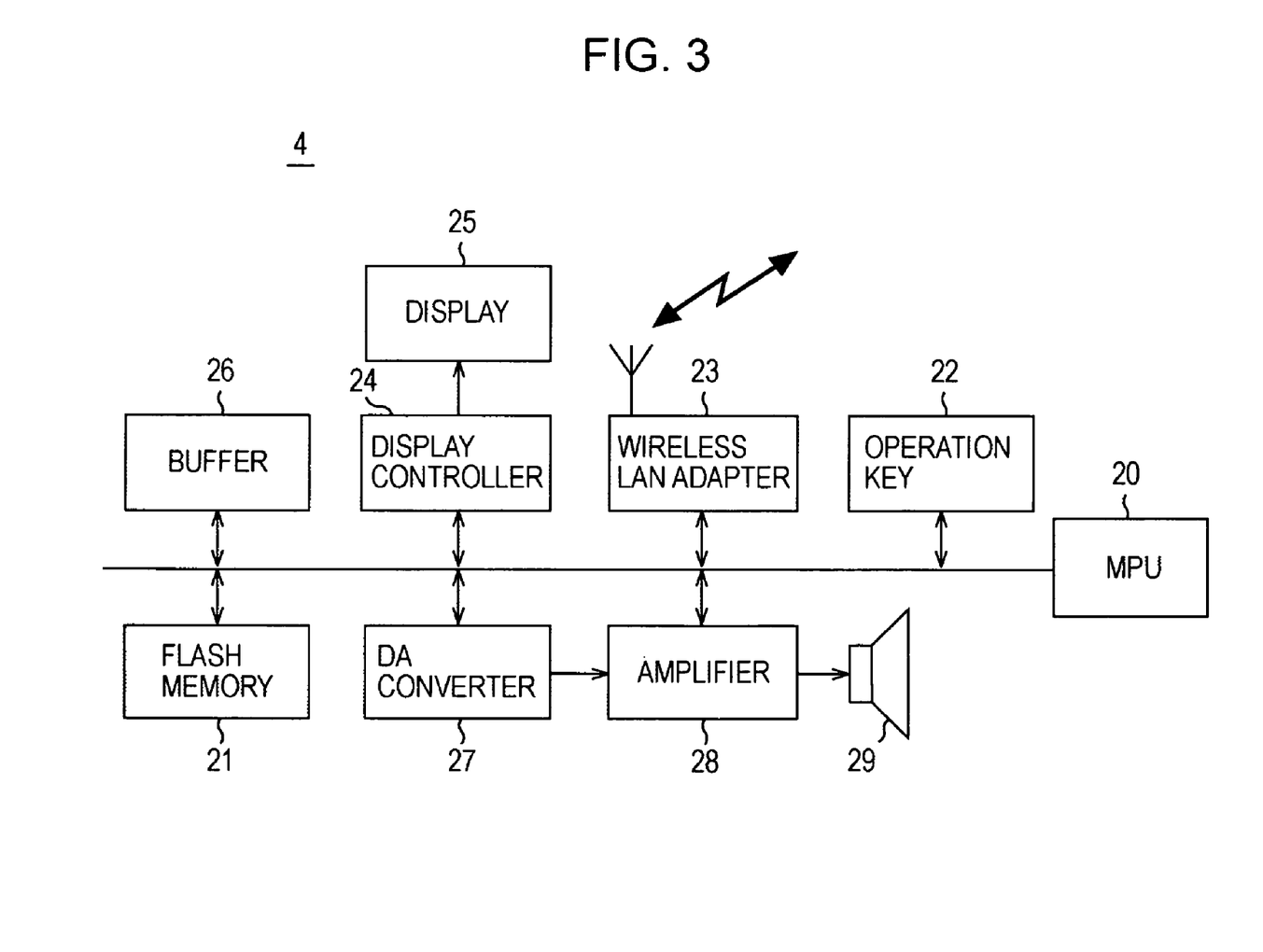
FIG. 3 is a block diagram illustrating the circuit configuration of an audio player.

Next, the circuit configuration of the audio player 4 will be described with reference to FIG. 3. The audio player 4 is configured around an MPU (Micro Processing Unit) 20, and is configured such that the MPU 20 centrally controls the overall audio player 4 following basic programs and other various types of programs such as for audio playing, playing state displaying, and so forth, read out from internal memory (unshown) or flash memory 21.

Under control of the MPU 20, a wireless LAN adapter 23 converts the data supplied via the bus into packets and into airwaves, so as to transmit data to the access point 3 via the wireless LAN, and also extract data from wireless packets received from the access point 3, thereby performing data reception over the wireless LAN.

Also, the wireless LAN adapter 23 has, as basic functions relating to the wireless LAN, functions for detecting the strength of airwaves of frequencies used (e.g., the 2.4 GHz band, etc.), functions for detecting S/N (Signal/Noise) ratio at the frequency band used, and so forth.

In actual practice, the wireless LAN adapter 23 switches to the most suitable link speed of multiple links speeds, such as 11 MB/s, 5.5 MB/s, 2 MB/s, 1 MB/s, and so forth, in accordance with the airwave strength from the access point 3 and the detected S/N ratio and so forth, so as to establish a wireless connection (link), thereby exchanging data.

It should be noted that with the wireless LAN adapter 23, these link speeds are only theoretical upper limits of data transfer speed. Accordingly, the actual data transfer speed at the wireless LAN adapter 23 may be slower than the link speed due to the airwave strength and S/N ratio at that point in time.

A display controller 24 is arranged to display on a display 25 various kinds of information such as volume and current time, under the control of the MPU 20, and also display contents instructed form the MPU 20.

In actual practice, upon recognizing that an operation has been performed for playing audio data by an operating key 22 for example, the MPU 20 of the audio player 4 establishes a wireless communication with the wireless LAN adapter 23 and the access point 3 (FIG. 1), and transmits a list request signal requesting a list of audio data stored in the server 2, to the server 2 via the access point 3.

Upon receiving the list of audio data sent as a result thereof from the server 2 via the wireless LAN adapter 23, the MPU 20 displays the received list on the display 25 with the display controller 24. Note that in this case, the list being displayed is, for example, music titles corresponding to each of the audio data stored in the server 2.

The MPU 20 thus displays the list on the display 25, and upon recognizing that a playing operation has been made with the operating key 22 for selecting one of the audio data listed in the list, transmits an audio data request signal to the server 2 via the wireless LAN adapter 23 in response, to request the selected audio data.

Consequently, upon transmission of the audio data starting from the server 2, the MPU 20 receives the audio data via the wireless LAN adapter 23, and sequentially writes the audio data regarding which reception has been completed, to a buffer 26. Note that the audio data transmitted form the server 2 is linear PCM format data, which has been subjected to digital processing such as decoding and so forth at the server 2 side.

The MPU 20 then sequentially sends the audio data stored in the buffer 26 to a DA converter 27, at a speed corresponding to the bit rate set for the audio data, in the order in which the audio data was stored in the buffer 26.

The DA converter 27 obtains audio signals by subjecting the audio data being sent thereto to digital/analog conversion processing, and the audio signals are amplified by an amplifier 28 and output as audio form a speaker 29. Note that in the following description, the processing wherein the portions of audio data regarding which reception have been completed are sequentially subjected to digital/analog conversion is also called "streaming playing".

Note that the amplifier 28 has a mute function, and upon muting being performed under control of the MPU 20, no sound is output from the speaker 29, regardless of audio signals begin supplied form the DA converter 27.

Thus, the audio player 4 establishes a wireless connection with the access point 3, and accordingly perform streaming player of the audio data being sent from the server 2 via the access point 3 by wireless communication.

(2) Display of Playing State

Note that the audio player 4 may experience deterioration in effective data transmission speed due to wireless communication being interrupted due to external noise and the like, due to the wireless communication with the access point 3 being wireless communication. In such cases, the audio player 4 cannot continuously receive audio data, meaning that the audio will cut out at the point that the audio data in the buffer 26 (FIG. 3) is depleted.

Accordingly, the audio player 4 is arranged to predict whether or not audio of the audio data can be continuously played without cutting out, when in an audio playing mode wherein streaming playing of audio data is being performed, based on the communication state of wireless communication and the data transfer speed necessary for playing the audio data.

Specifically, in order to obtain a prediction value for communication speed according to the state of airwaves at that point in time, the audio player 4 calculates the communication speed estimation value VE shown in the following Expression (1), using the link speed VL of the wireless connection established with the access point 3, the airwaves strength LR detected by the wireless LAN adapter 23, the S/N (Signal/Noise) ratio SNR (hereafter, the above VL, LR, and SNR may be collectively referred to as "wireless connection state values"), and predetermined coefficients C1 and C2.

$$VE = VL \times (C1 \times LR + C2 \times SNR) \quad (1)$$

Now, the communication speed estimation value VE is a value obtained by the theoretical link speed VL being deteriorated by the airwaves strength LR and S/N ratio SNR, and is equivalent to an estimated value of the data transfer speed in wireless communication.

Also, the audio player 4 takes the bit rate to the audio data being played or to be played, as the playing bit rate BR, with no change. On the other hand, in the event that the audio data to be played is not yet selected, the audio player 4 sets a standard bit rate (e.g., 128 kb/s or the like) as the playing bit rate BR, for convenience.

Next, the audio player 4 calculates a predicted communication speed ratio RV shown in Expression (2) below, as the ratio of the playing bit rate BR as to the communication speed estimation value VE.

$$RV = VE/BR \quad (2)$$

The predicted communication speed ratio RV is a value obtained by dividing the communication speed estimation value VE by the bit rate BR, representing the percentage of data speed necessary for continuous playing of the audio data as to the predicted data transfer speed, and accordingly represents the degree of leeway in wireless communication.

Note that a predicted communication speed ratio RV exceeding 1 indicates that the data transfer speed is relatively fast, and a predicted communication speed ratio RV below 1 indicates that the data transfer speed is relatively slow.

Accordingly, the audio player 4 is arranged so as to predict that the greater the predicted communication speed ratio RV is, the more the audio data can be continuously played without cutting out. With the audio player 4, the playing state is divided into four levels, from playing state 0 to playing state 3, depending on the value of the predicted communication speed ratio RV, and the audio player 4 determines which level the playing state currently is in.

Figure 4A:
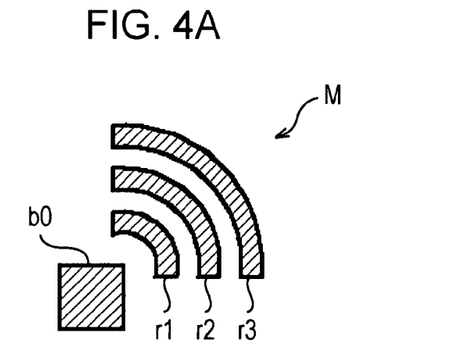
FIGS. 4A through 4E are diagrams illustrating the configuration of a playing state display mark and display patterns thereof.

Further, the audio player 4 is arranged to display a playing state display mark M such as shown in FIG. 4A on the display 25, in accordance with the predicted playing state.

Now, this playing state display mark M is configured around a generally-square square portion b0, with three types of quarter circles (arcs) r1, r2, and r3, each of which have different radii centered on the upper right corner of the square portion b1 and each of which are situated on the upper right side of the square portion b0.

Further, this playing state display mark M is arranged so as to be switched between display of the four levels, from display pattern 0 to display pattern 3, according to how the square portion b1 and the quarter circles r1, r2, and r3, are combined.

Figure 4B:
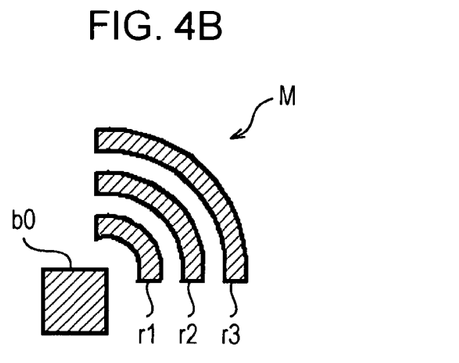
Figure 4C:
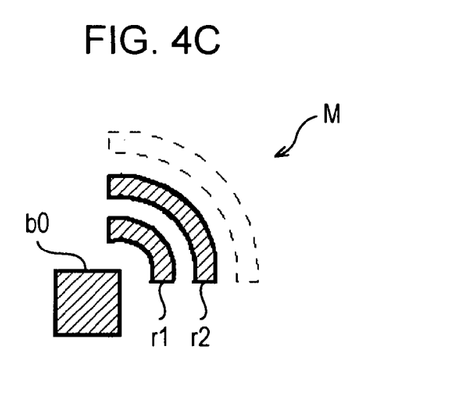
Figure 4D:
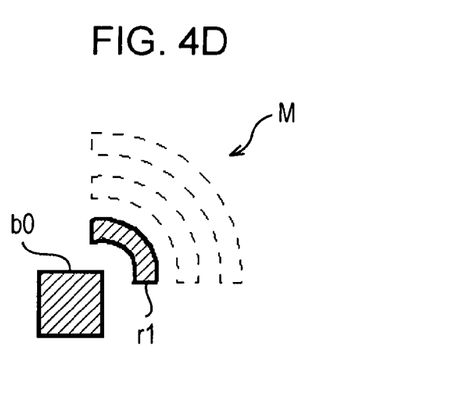

With the playing state display mark M, in the event of the display pattern 3, the square portion b1 and the three quarter circles r1, r2, and r3, i.e., all components, are lit, as shown in FIG. 4B. In the event of the display pattern 2, the square portion b1 and the quarter circles r1 and r2 are lit, as shown in FIG. 4C. In the event of the display pattern 1, the square portion b1 and just the quarter circle r1 are lit, as shown in FIG. 4D.

Figure 4E:
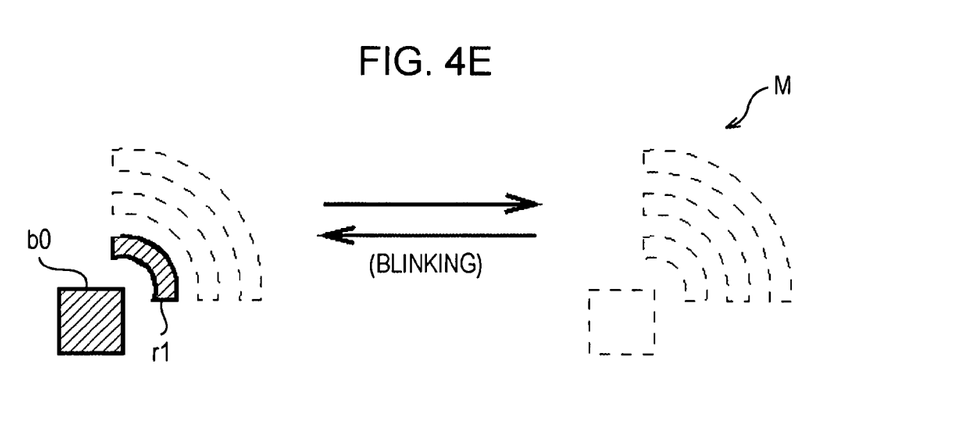

Also, in the event of the display pattern 0, the playing state display mark M goes between a state wherein the square portion b1 and just the quarter circle r1 are lit (i.e., a state the same as with the display pattern 1), and a state wherein the entire playing state display mark M turns off, at a predetermined cycle (e.g., 0.5 seconds), i.e., the playing state display mark M is the pattern 1 in a blinking state, as shown in FIG. 4E.

Now, it should be understood that the audio player 4 performs prediction of the playing state and displays the playing state display mark M on the display 25 according to the applying state, following different judgment standards for when the audio data is being played and not being played.

(2-1) When not Playing

In the event that the audio player 4 is in a non-playing state, with audio data not being played, the audio player 4 predicts the playing state according to the value of the predicted communication speed ratio RV, and displays the playing state display mark M shown in FIG. 4A on the display 25 in a state corresponding to the playing state.

In operation, in the event that the predicted communication speed ratio RV is 3.0 or higher, the audio player 4 predicts that the audio data can be constantly played without cutting out, i.e., that the playing state is playing state 3, and the playing state display mark M in the display pattern 3 shown in FIG. 4B is displayed on the display 25.

Also, in the event that the predicted communication speed ratio RV is 2.0 or higher but below 3.0, the audio player 4 predicts that the probability of the audio data cutting out is low, i.e., that the playing state is playing state 2, and the playing state display mark M in the display pattern 2 shown in FIG. 4C is displayed on the display 25.

Further, in the event that the predicted communication speed ratio RV is 1.0 or higher but below 2.0, the audio player 4 predicts that the probability of the audio data cutting out is high, i.e., that the playing state is playing state 1, and the playing state display mark M in the display pattern 1 shown in FIG. 4D is displayed on the display 25.

On the other hand, in the event that the predicted communication speed ratio RV is below 1.0, the audio player 4 predicts that the audio data cannot be played, or that the audio data will most certainly cut out, i.e., that the playing state is playing state 0, and the playing state display mark M in the display pattern 0 shown in FIG. 4E is displayed on the display 25.

Note that in the event that the audio player 4 cannot link with the access point 3, prediction is made that the audio data cannot be played, i.e., that the playing state is playing state 0, and the playing state display mark M in the display pattern 0 shown in FIG. 4E is displayed on the display 25.

(2-2) When Playing

On the other hand, in the event of playing audio data, the audio player 4 is arranged to predict the playing state by also taking into consideration the remaining audio data CR stored in the buffer 26 (FIG. 3), in addition to the value of the predicted communication speed ratio RV.

With the audio player 4, a predicted communication speed ratio RV exceeding 1 indicates that the data transfer speed is relatively fast, so the amount of data remaining in the buffer 26 gradually increases as the audio data is played. Conversely, a predicted communication speed ratio RV below 1 indicates that the data transfer speed is relatively slow, so the amount of data remaining in the buffer 26 gradually decreases as the audio data is played.

In operation, in the event that the predicted communication speed ratio RV is 3.0 or higher, the audio player 4 predicts that the audio data can be constantly played without cutting out regardless of the remaining data amount CR in the buffer 26, determination is made that the playing state is the playing state 3, and the playing state display mark M in the display pattern 3 shown in FIG. 4B is displayed on the display 25.

Also, in the event that the predicted communication speed ratio RV is 1.0 or higher but below 3.0, the audio player 4 takes note of the percentage for the remaining data amount CR as to the entire capacity of the buffer 26, and in the event that this percentage is 50% or higher, the audio player 4 predicts that the audio data can be constantly played without cutting out, determination is made that the playing state is the playing state 3, and the playing state display mark M in the display pattern 3 shown in FIG. 4B is displayed on the display 25.

Conversely, in the event that the percentage for the remaining data amount CR as to the entire capacity of the buffer 26 is below 50%, the audio player 4 predicts that the probability of the audio data cutting out is low, i.e., that the playing state is playing state 2, and the playing state display mark M in the display pattern 2 shown in FIG. 4C is displayed on the display 25.

On the other hand, in the event that the predicted communication speed ratio RV is below 1.0, the audio player 4 uses the following Expression (3) to divide the remaining data amount CR of audio data in the buffer 26 by a value obtained by subtracting the communication speed estimation value VE from the bit rate BR, thereby calculating a predicted play continuation time TE, which is the predicted amount of time until the remaining data amount CR runs out, in the event that the audio data is played without cutting out.

$$TE = CR/(BR - VE) \quad (3)$$

Note that "a value obtained by subtracting the communication speed estimation value VE from the bit rate BR" represents the amount of insufficient data per unit time in a case of playing the audio data without cutting out, and this value is equivalent to the consumption speed of the remaining data amount CR of audio data in the buffer 26.

Now, in the event that the predicted play continuation time TE is 5 seconds or more, the audio player 4 predicts that the probability of the audio data cutting out is low, i.e., that the playing state is playing state 2, and the playing state display mark M in the display pattern 2 shown in FIG. 4C is displayed on the display 25.

Also, in the event that the predicted play continuation time TE is 2 seconds or more but less than 5 seconds, the audio player 4 predicts that the probability of the audio data cutting out is high, i.e., that the playing state is playing state 1, and the playing state display mark M in the display pattern 1 shown in FIG. 4D is displayed on the display 25.

On the other hand, in the event that the predicted play continuation time TE is less than 2 seconds, the audio player 4 predicts that the audio data cannot be played, or that the sound will most certainly cut out, i.e., that the playing state is playing state 0, and the playing state display mark M in the display pattern 0 shown in FIG. 4E is displayed on the display 25.

(2-3) Test Mode

Further, in addition to the audio playing mode for actually playing audio data, the audio playing device 4 has a test mode for determining the playing state using a theoretical value without actually transmitting audio data, such as in the case of installation of a newly-purchased audio playing device 4 by the user.

In the case of the test mode, the audio player 4 exchanges signals with the server 2 to the effect that the audio player 4 will enter the test mode, and then establishes a wireless connection with the access point 3. Subsequently, the audio player 4 calculates the communication speed estimation value VE with Expression (1) using the theoretical link speed VL with the wireless connection, the airwave strength LR, and S/N ratio SNR, and also calculates the predicted communication speed ratio RV with Expression (2) using a standard bit rate (e.g., 128 kb/s or the like) as the playing bit rate BR, for convenience, thereby performing prediction and determination in the same way as with the audio playing mode.

Thus, the audio player 4 can test-determine the playing state, without actually using audio data.

The audio player 4 has the amplifier 28 (FIG. 3) muted at this time, so there is no output of sound, thereby preventing static noise or the being erroneously output.

(3) Playing State Presentation Processing

Figure 5:
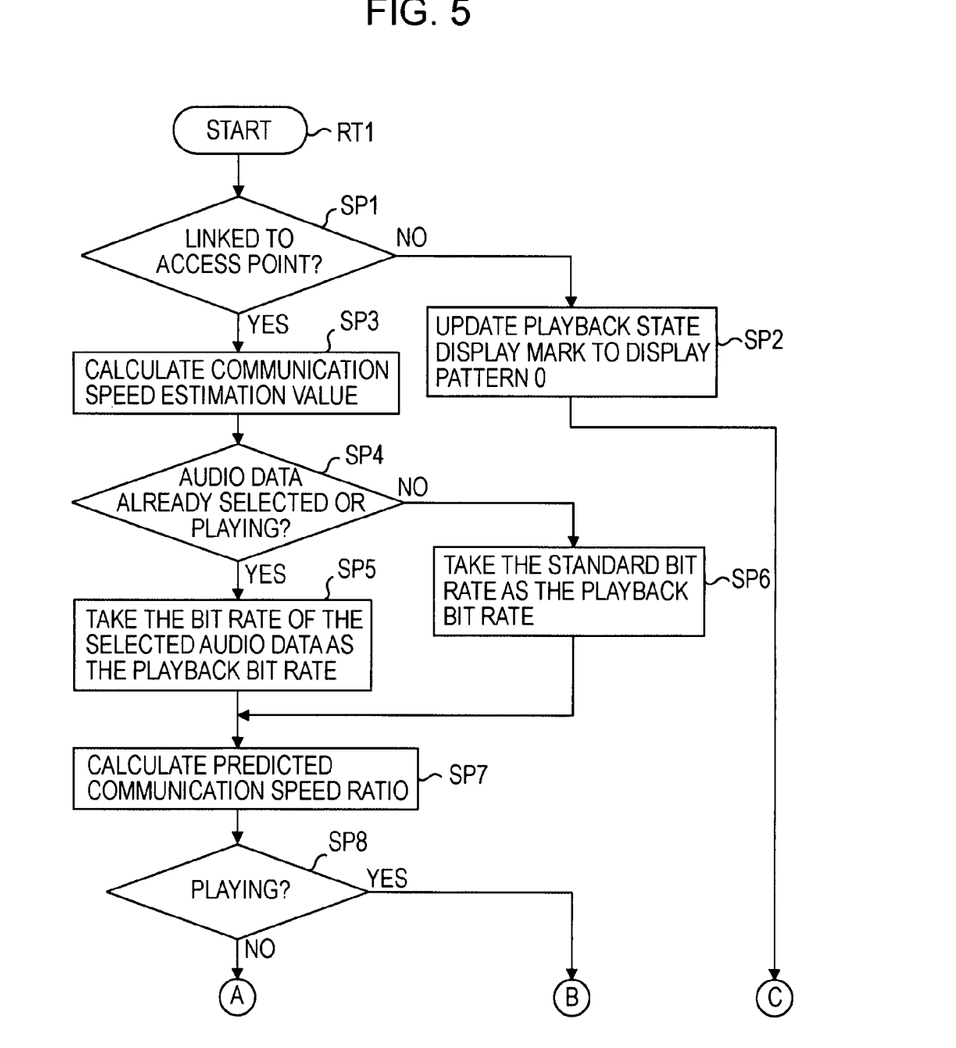
FIG. 5 is a flowchart illustrating playing state display processing procedures (1)
Figure 6:
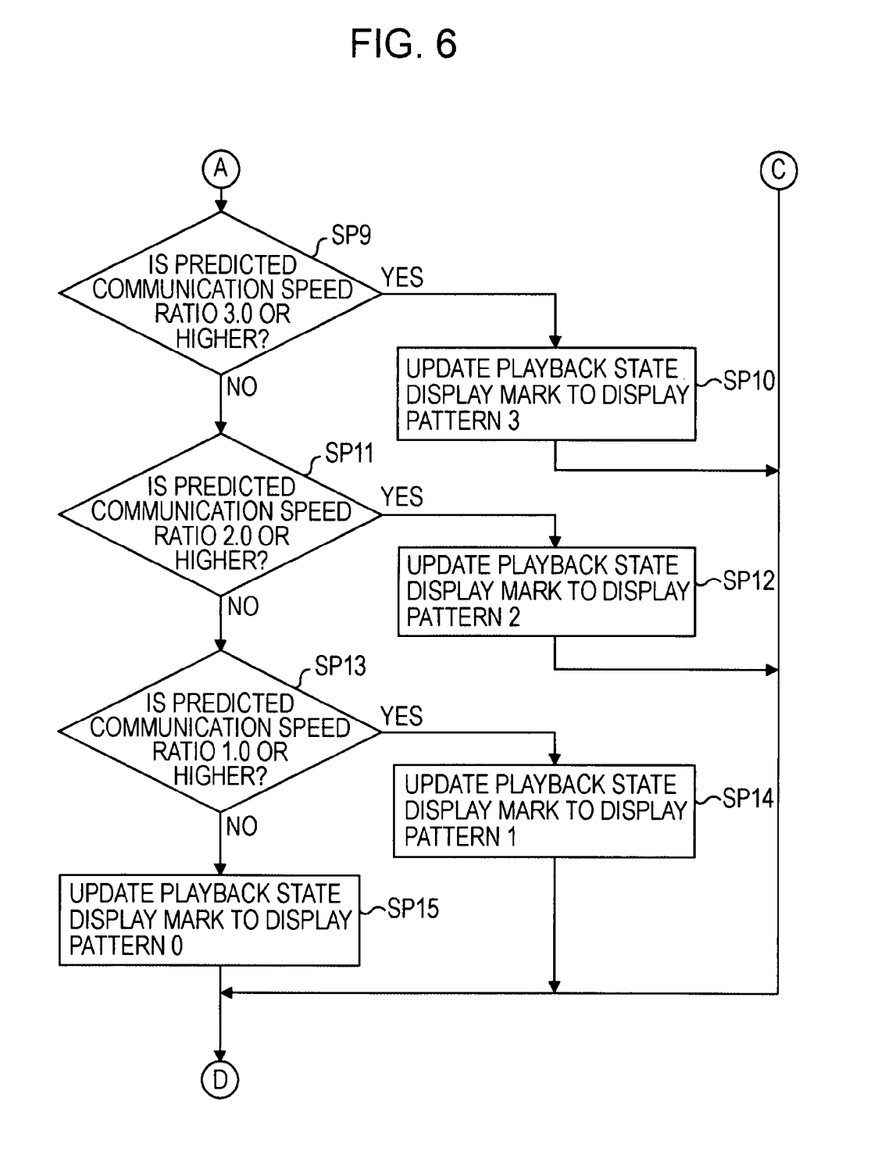
FIG. 6 is a flowchart illustrating playing state display processing procedures (2)

Next, the playing state presentation processing procedure RT1, carried out for determining the playing state at the audio player 4 and also presenting the current playing state to the user with a playing state display mark M corresponding to the playing state, will be described with reference to FIGS. 5 through 7. Note that this playing state presentation processing procedure RT1 can handle the above-described audio playing mode.

Upon the power being turned on, the MPU 20 of the audio player 4 starts the playing state presentation processing procedure RT1 and goes to step SP1. In step SP1, the MPU 20 determines whether or not a wireless connection has been established with the access point 3, i.e., whether or not it is in a linked state. In the event that the result here is NO, this means that a wireless connection with the access point 3 has not been established, i.e., that the audio player 4 can be said to be in the playing state 0, and the MPU 20 proceeds to step SP2.

Figure 7:
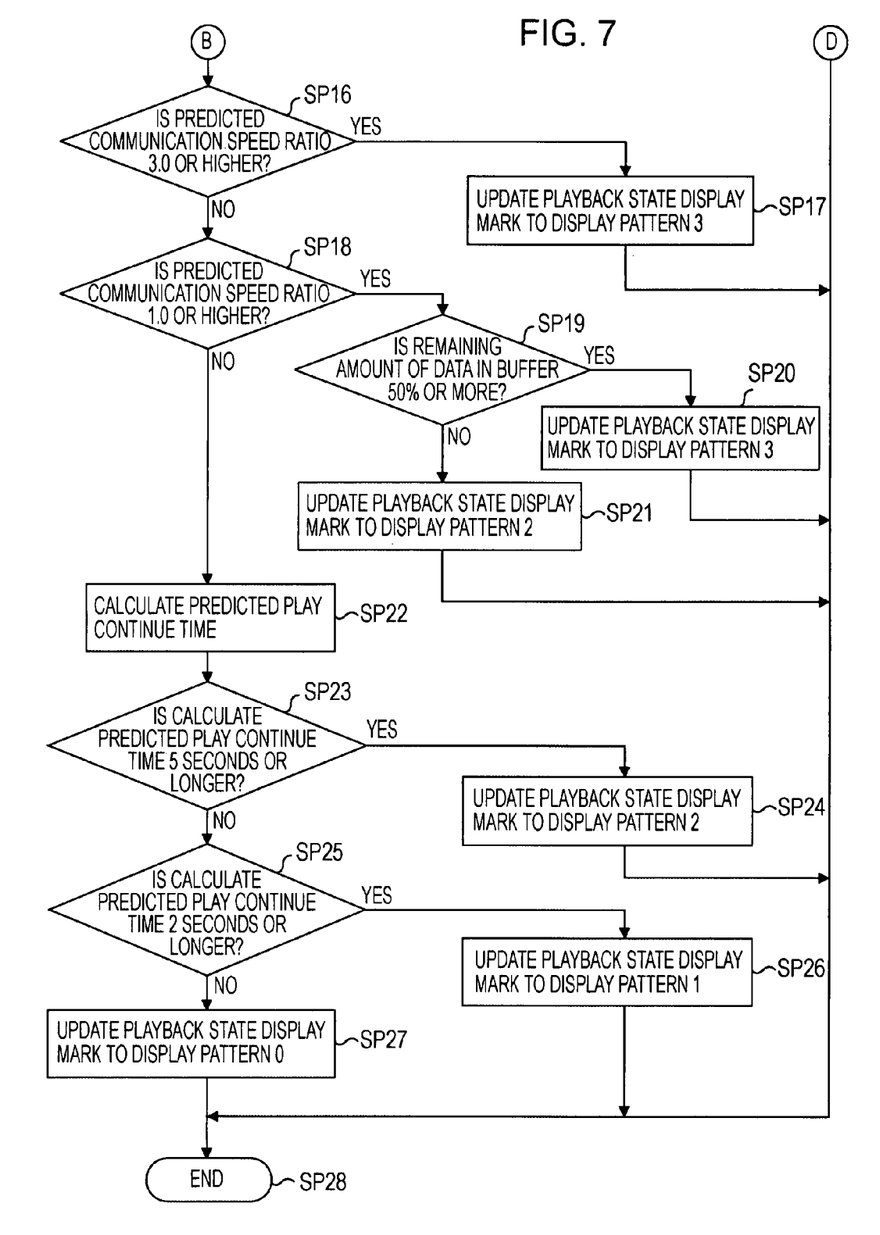
FIG. 7 is a flowchart illustrating playing state display processing procedures (3).

In step SP2, the MPU 20 predicts that the playing state is the playing state 0, controls the display controller 24 so as to update the playing state display mark M to be displayed on the display 25 to the display pattern 0, and proceeds to the following step SP28 (FIG. 7).

On the other hand, in the event that the result of step SP1 is YES, this means that a wireless connection with the access point 3 has been established and wireless communication can be made, and the MPU 20 proceeds to the next step SP3.

In step SP3, the MPU 20 calculates the communication speed estimation value VE with Expression (1) using the theoretical link speed VL with the wireless connection, the airwave strength LR, and S/N ratio SNR, and the flow proceeds to the next step SP4.

In step SP4, the MPU 20 determines whether or not audio data to be played has already been selected, or whether the audio data is already being played. In the event that the result is YES, the MPU 20 proceeds to the next step SP5.

In step SP5, the MPU 20 sets the bit rate of the audio selected (or playing) as the playing bit rate BR, and proceeds to the next step SP7.

On the other hand, in the event that the result in step SP5 is NO, this means that the bit rate cannot be identified, so the MPU 20 proceeds to the next step SP6. In step SP6, the MPU 20 takes a standard bit rate (e.g., 128 kb/s) as the playing bit rate BR for convenience, and proceeds to the next step SP7.

In step SP7, the MPU 20 calculates the predicted communication speed ratio RV with Expression (2) as the ratio of the playing bit rate BR as to the communication speed estimation value VE, and proceeds to the next step SP8.

In step SP8, the MPU 20 determines whether or not the audio data is playing. In the event that the result here is NO, this means that there is no need to take into consideration the remaining data amount CR in the buffer 26 (FIG. 3), and the MPU 20 proceeds to the next step SP9 (FIG. 6).

In step SP9, the MPU 20 determines whether or not the value of the predicted communication speed ratio RV is 3.0 or more. In the event that the result here is YES, this means that the audio player 4 can be considered to be in the playing state 3, and the MPU 20 proceeds to the next step SP10.

In step SP10, the MPU 20 predicts that the playing state is the playing state 3, controls the display controller 24 so as to update the playing state display mark M to be displayed on the display 25 to the display pattern 3, and proceeds to the following step SP28.

On the other hand in the event that the result of step SP9 is NO, the MPU 20 proceeds to the next step SP11, and determines whether or not the value of the predicted communication speed ratio RV is 2.0 or more. In the event that the result here is YES, this means that the audio player 4 is in the playing state 2, and the MPU 20 proceeds to the next step SP12.

In step SP12, the MPU 20 predicts that the playing state is the playing state 2, controls the display controller 24 so as to update the playing state display mark M to be displayed on the display 25 to the display pattern 2, and proceeds to the following step SP28.

On the other hand in the event that the result of step SP11 is NO, the MPU 20 proceeds to the next step SP13, and determines whether or not the value of the predicted communication speed ratio RV is 1.0 or more. In the event that the result here is YES, this means that the audio player 4 is in the playing state 1, and the MPU 20 proceeds to the next step SP14.

In step SP14, the MPU 20 predicts that the playing state is the playing state 1, controls the display controller 24 so as to update the playing state display mark M to be displayed on the display 25 to the display pattern 1, and proceeds to the following step SP28.

On the other hand in the event that the result of step SP13 is NO, this means that the audio player 4 can be considered to be in the playing state 0, and the MPU 20 proceeds to the next step SP15.

In step SP15, the MPU 20 predicts that the playing state is the playing state 0, controls the display controller 24 so as to update the playing state display mark M to be displayed on the display 25 to the display pattern 0, and proceeds to the following step SP28.

Conversely, in the event that the result in step SP8 (FIG. 5) is YES, this means that there is the need to take into consideration the remaining data amount CR in the buffer 26 (FIG. 3) when determining the playing state, and the MPU 20 proceeds to the next step SP16 (FIG. 7).

In step SP16, the MPU 20 determines whether or not the value of the predicted communication speed ratio RV is 3.0 or more, as with the case in step SP9. In the event that the result here is YES, this means that the audio player 4 can be considered to be in the playing state 3, and the MPU 20 proceeds to the next step SP17.

In step SP17, the MPU 20 predicts that the playing state is the playing state 3, controls the display controller 24 so as to update the playing state display mark M to be displayed on the display 25 to the display pattern 3, and proceeds to the following step SP28.

On the other hand, in the event that the result of step SP16 is NO, the MPU 20 proceeds to the next step SP18. In step SP18, the MPU 20 determines whether or not the predicted communication speed ratio RV is 1.0 or more. In the event that the result here is YES, the MPU 20 further proceeds to the next step SP19, and determines whether or not the remaining data amount CR in the buffer 26 is 50% or more.

In the event that the result in step SP19 is YES, this means that there is sufficient remaining data amount CR in the buffer 26 so the audio player 4 can be considered to be in the playing state 3, and the MPU 20 proceeds to the next step SP20.

In step SP20, the MPU 20 predicts that the playing state is the playing state 3, controls the display controller 24 so as to update the playing state display mark M to be displayed on the display 25 to the display pattern 3, and proceeds to the following step SP28.

On the other hand, in the event that the result in step SP19 is NO, this means that the remaining data amount CR in the buffer 26 is somewhat insufficient so the audio player 4 can be considered to be in the playing state 2, and the MPU 20 proceeds to the next step SP21.

In step SP21, the MPU 20 predicts that the playing state is the playing state 2, controls the display controller 24 so as to update the playing state display mark M to be displayed on the display 25 to the display pattern 2, and proceeds to the following step SP28.

On the other hand, in the event that the result in step SP18 is NO, this means that the predicted communication speed ratio RV is below 1.0, and that the reception speed of audio data is relatively slow. The MPU 20 proceeds to the next step SP22.

In step S22, the MPU 20 uses the above-described Expression (3) calculate the predicted play continuation time TE using the remaining data amount CR, bit rate BR, and communication speed estimation value VE, and proceeds to the next step SP23.

In step SP23, the MPU 20 determines whether or not the predicted play continuation time TE is 5 seconds or more. In the event that the result here is YES, this means that the audio player 4 can be considered to be in the playing state 2, and the MPU 20 proceeds to the next step SP24.

In step SP24, the MPU 20 predicts that the playing state is the playing state 2, controls the display controller 24 so as to update the playing state display mark M to be displayed on the display 25 to the display pattern 2, and proceeds to the following step SP28.

On the other hand, in the event that the result in step SP23 is NO, the MPU 20 determines in step SP25 whether or not the predicted play continuation time TE is 2 seconds or more. In the event that the result here is YES, this means that the audio player 4 can be considered to be in the playing state 1, and the MPU 20 proceeds to the next step SP26.

In step SP26, the MPU 20 predicts that the playing state is the playing state 1, controls the display controller 24 so as to update the playing state display mark M to be displayed on the display 25 to the display pattern 1, and proceeds to the following step SP28.

Conversely, in the event that the result in step SP25 is NO, this means that the audio player 4 can be considered to be in the playing state 0, and the MPU 20 proceeds to the next step SP27.

In step SP27, the MPU 20 predicts that the playing state is the playing state 0, controls the display controller 24 so as to update the playing state display mark M to be displayed on the display 25 to the display pattern 0, and proceeds to the following step SP28.

In step SP28, the MPU 20 ends the playing state presentation processing procedure RT1.

Note that the MPU 20 of the audio player 4 performs the playing state presentation processing procedure RT1 every predetermined time interval (e.g., 3 seconds) while the power is turned on, so as to periodically predict the playing state and update the playing state display mark M, thereby always notifying the user of the newest playing state.

Also, in the above-described test mode, in step SP3 the MPU 20 of the audio player 4 calculates the theoretical communication speed estimation value VE, in step SP6 uses a standard bit rate (e.g., 128 kb/s) as the playing bit rate BR for convenience, and then proceeds to the processing from step SP7 and subsequent steps in the same way as with the audio playing mode.

(4) Operations and Advantages

With the above configuration, the MPU 20 of the audio player 4 calculates the communication speed estimation value VE with Expression (1) using the link speed VL, the airwave strength LR, and S/N ratio SNR, further calculates the predicted communication speed ratio RV with Expression (2) using the communication speed estimation value VE and the playing bit rate BR, determines the playing state according to the predicted communication speed ratio RV, and displays the playing state display mark M according to the playing state on the display 25.

Accordingly, the MPU 20 of the audio player 4 can notify the user of prediction results regarding whether the audio data can be continuously played by way of the playing state display mark M display pattern, rather than just the wireless connection state between the access point 3 and wireless LAN adapter 23 (FIG. 3), so the user can tell directly from the playing state display mark M whether or not the sound from the audio data is going to cut out, which is of greatest interest for the user.

At this time, the MPU 20 of the audio player 4 takes into consideration not only just the wireless connection state between the access point 3 and wireless LAN adapter 23 (FIG. 3), but the bit rate of the audio to be actually played (i.e., playing bit rate BR), whereby highly precise estimation can be made with regard to whether or not the audio data can be continuously played, and this can be notified to the user.

Also, in the event that the audio data is playing, the MPU 20 of the audio player 4 determines the playing state in accordance with the remaining data amount CR of the buffer 26 in addition to the wireless condition state between the access point 3 and the wireless LAN adapter 23 (FIG. 3) and bit rate of the audio data, in the event that the predicted communication speed ratio RV is relatively small (smaller than 3.0) (step SP19).

Accordingly, the MPU 20 of the audio player 4 can reflect the remaining data amount CR of the buffer 26, which is a direct factor in whether or not the audio data can be continuously played, in determination of the playing state, and highly-precise determination results regarding the playing state can be notified to the user.

Moreover, in the event that the predicted communication speed ratio RV is very small (smaller than 1.0), the MPU 20 of the audio player 4 uses the above-described Expression (3) calculate the predicted play continuation time TE using the remaining data amount CR, bit rate BR, and communication speed estimation value VE, and determines the playing state according to the predicted play continuation time TE (steps SP23 and SP25).

Accordingly, based on the value of the predicted play continuation time TE which represents how many seconds the audio data can be continuously played, the MPU 20 of the audio player 4 notify the user of the playing state that has been determined in an even more exacting manner.

According to the above-described configuration, the MPU 20 of the audio player 4 calculates the communication speed estimation value VE using the link speed VL, the airwave strength LR, and S/N ratio SNR, further calculates the predicted communication speed ratio RV using the communication speed estimation value VE and the playing bit rate BR, predicts the playing state according to the predicted communication speed ratio RV, and displays the playing state display mark M according to the playing state on the display 25, thereby the determination results regarding the playing state can be notified to the user, so the user can be directly made to recognize whether or not sound from the audio data can be continuously output.

(5) Other Embodiments

While the embodiment described above is an arrangement wherein three types of detection values of wireless connection conditions, i.e., the link speed VL, the airwave strength LR, and S/N ratio SNR, are used for calculating the communication speed estimation value VE, the present invention is not restricted to this, and an arrangement may be made wherein two of the wireless connection condition values, or even just one detection value is used to calculate the communication speed estimation value VE. In this case, theoretical values can be used instead of the wireless connection condition values not used. Also, arrangements may be made wherein a theoretical value is substituted in the event that the audio player 4 cannot correctly obtain one of the wireless connection condition values, or a certain theoretical value is used instead of a detected value for a part of the wireless connection condition values beforehand (e.g., the S/N ratio SNR).

Using two or even one detection value of the wireless connection condition values results in a lower precision of the communication speed estimation value VE as compared with a case of using all three, but the next-best communication speed estimation value VE can be obtained.

Also, while the embodiment described above is an arrangement wherein the prediction technique for the playing state is changed according to whether or not the audio data is being played (step SP8, FIG. 5), the present invention is not restricted to this, and an arrangement may be made wherein the playing state display mark M is updated based on determination of the playing state following the processing in steps SP9 through SP15 (FIG. 6) without taking into consideration the remaining data amount CR in the buffer 26 even when the audio data is being played, for example.

In this case, while the determination precision for the playing state deteriorates somewhat, the processing load on the MPU 20 of the audio player 4 can be reduced.

Further, with the embodiment described above, an arrangement is made wherein the predicted play continuation time TE is calculated only in the event that the predicted communication speed ratio RV is below 1.0 (steps SP22, FIG. 7) so as to determine the playing state, but the present invention is not restricted to this, and an arrangement may be made wherein the predicted play continuation time TE is calculated also in the event that the predicted communication speed ratio RV is 1.0 or above, and the playing state is determined according to the predicted play continuation time TE.

Further, with the embodiment described above, an arrangement is made wherein the remaining data amount CR in the buffer 26 is used to determine the playing state only in the event that the predicted communication speed ratio RV is 1.0 or above but lower than 3.0, but the present invention is not restricted to this arrangement, and arrangements may be made wherein remaining data amount CR in the buffer 26 is used to determine the playing state in the event that the predicted communication speed ratio RV is below 1.0, or in the event that the predicted communication speed ratio RV is 3.0 or higher.

Further, with the embodiment described above, an arrangement is made wherein the playing state is classified into four levels according to the predicted communication speed ratio RV in the event that the audio data is not being played, but the present invention is not restricted to this arrangement, and the playing state may be classified into three or fewer levels, or into five or more levels.

Further, with the embodiment described above, an arrangement is made wherein the playing state determined based on the predicted communication speed ratio RV and so forth is notified to the user with the playing state display mark M, but the present invention is not restricted to this arrangement, and an arrangement may be made wherein, in the event that the playing state is playing state 2 or lower, the display 25 displays text messages or icons or the like to the effect that "airwaves are too weak", "noise level is too high", and so forth, in addition to the playing state display mark M, to indicate the reason why the playing state has deteriorated.

In this case, the airwave strength VL, S/N ratio SNR, predicted play continuation time TE, and so forth, may be represented by specific numerical values, by the length of bar displays, by display colors, or the like. Further, an arrangement may be made wherein these values are always displayed on the display 25 regardless of the playing state.

Further, with the embodiment described above, an arrangement is made wherein the sound is muted in the test mode so that no sound is output, but the present invention is not restricted to this arrangement, and an arrangement may be made wherein, in the test mode for example, a predetermined test sound (e.g., monophonic output of 1 kHz) is output, thereby notifying the user that the device is operating correctly in the test mode.

Further, with the embodiment described above, an arrangement is made wherein, in the test mode, the communication speed estimation value VE is calculated using the theoretical link speed VL with the wireless communication, the airwave strength LR, and S/N ratio SNR and so forth, but the present invention is not restricted to this arrangement, and an arrangement may be made wherein, for example, test dummy data having the same bit rate as the audio data is actually transmitted, and the communication speed estimation value VE is calculated using the link speed VL at the time of receiving the dummy data, the airwave strength LR, and S/N ratio SNR and so forth.

Further, with the embodiment described above, an arrangement is made wherein the playing state presentation processing procedure RT1 (FIGS. 5 through 7) is performed every predetermined time interval (e.g., 3 seconds), so as to update the playing state display mark M, but the present invention is not restricted to this arrangement, and an arrangement may be made wherein the playing state presentation processing procedure RT1 is performed at shorter time intervals (e.g., once every second) just while in the test mode, for example. This reduces the time which the user has to wait until the playing state display mark M is updated, in cases of the user searching for an optimal location for the audio player 4 or the access point 3 while referring to the playing state display mark M.

Further, with the embodiment described above, an arrangement is made wherein the user is notified of the playing state by the playing state display mark M displayed on the display 25 being changed, but the present invention is not restricted to this arrangement, and an arrangement may be made wherein the user is notified of the playing state by various types of notification means, such as, for example, display colors or blinking patterns of an indicator, or alarm sounds output from a speaker, or the like.

Further, with the embodiment described above, an arrangement is made wherein wireless communication is performed between the access point 3 and the wireless LAN adapter 23 of the audio player 4, compliant to a wireless LAN standard such as IEEE 802.11a/b/g or the like, but the present invention is not restricted to this arrangement, and wireless communication processing based on various standards, such as Bluetooth®, wireless USB (Universal Serial Bus), and so forth, for example.

Further, the above embodiment has been described as applying the present invention to an audio system wherein audio data, which is contents distributed from the server 2, is played at the audio player 4 in the form of streaming playing, but the present invention is not restricted to this arrangement, and an arrangement may be made wherein the present invention is applied to a video system wherein video data is stored in the server 2 for example, and the video data distributed from the server 2 is played at a video player in the form of streaming playing, that is to say, the present invention can be applied to various types of playing systems wherein contents data to be continuously played is played in the form of streaming playing.

Further, with the embodiment described above, an arrangement is made wherein a playing state presentation program is stored in internal memory (unshown) of the MPU 20, flash memory 21, or the like, but the present invention is not restricted to this arrangement, and an arrangement may be made wherein the playing state presentation program is read out from an external storage medium such as an unshown compact memory card or the like and stored in the flash memory 21, or the playing state presentation program is received from a predetermined computer or the like via a communication cable such as an unshown USB cable or the like, or even received from an unshown server via the access point 3 by wireless communication, or the like, that is to say, the playing state presentation program may be externally obtained and stored in the flash memory 21.

Further, with the embodiment described above, an arrangement is made regarding a case wherein the MPU 20 of the audio player 4 executes the playing state presentation program so as to perform determination and display of the playing state following the playing state presentation processing procedure RT1, but the present invention is not restricted to this arrangement, and an arrangement may be made wherein the audio player 4 has a hardware configuration including a playing state presentation circuit, with determination and display of the playing state being performed by the playing state presentation circuit.

Further, with the embodiment described above, an arrangement is made regarding a case wherein the audio player 4 serving as a playing state presentation device is configured of a wireless LAN adapter 23 serving as reception means, an MPU 20 serving as supplying means and playing state prediction means, and a display 25 serving as presentation means, but the present invention is not restricted to this arrangement, and an arrangement may be made wherein a playing state presentation device is configured reception means, supplying means, playing state prediction means, and presentation means, of various other types of circuit configurations.

It should be understood by those skilled in the art that various modifications, combinations, sub-combinations and alterations may occur depending on design requirements and other factors insofar as they are within the scope of the appended claims or the equivalents thereof.

What is claimed is:

1. A playing state presentation system having
   a contents server for supplying consecutive contents data, and
   a contents playing device for obtaining and playing said contents data;
   said contents playing device comprising:
   reception means for receiving said contents data from said contents server by wireless communication;
   supplying means for supplying said contents data to a playing unit which successively plays said contents data received by said reception means, with said contents data being supplied at a supply speed unique to said contents data;
   playing state prediction means for predicting a playing state based on an estimated communication speed ratio, wherein the playing state is an integer number indicative of whether or not said contents data can be continuously played at said playing unit; and
   presentation means for presenting said predicted playing state.

2. A playing state presentation device comprising:
   reception means for receiving consecutive contents data from a predetermined contents server by wireless communication;
   supplying means for continuously supplying said contents data to a playing unit which successively plays said contents data received by said reception means, with said contents data being supplied at a supply speed unique to said contents data;
   playing state prediction means for predicting a playing state based on an estimated communication speed ratio, wherein the playing state is an integer number indicative of whether or not said contents data can be continuously played at said playing unit; and
   presentation means for presenting said predicted playing state.

3. The playing state presentation device according to claim 2, wherein the estimated communication speed ratio is a ratio of the reception speed of said contents data by wireless communication to said supply speed.

4. The playing state presentation device according to claim 2, wherein said playing state prediction means calculate a prediction value for said reception speed, based on at least one of
   link speed of said wireless communication,
   reception strength of airwaves, and
   S/N (Signal/Noise) ratio,
   and predict said playing state based on the ratio of said reception speed estimation value of said contents data to said supply speed.

5. The playing state presentation device according to claim 4, wherein said playing state prediction means calculate a prediction value for said reception speed, by multiplying said link speed by a value obtained by adding said airwave reception strength and said S/N ratio that have each been multiplied with predetermined coefficients.

6. The playing state presentation device according to claim 2, further comprising
   temporary storage means for temporarily storing said contents data received by said reception means before supplying thereof to said playing unit;

wherein said playing state prediction means predict said playing state based on
the reception speed of said contents data,
said supply speed, and
the amount of said contents data stored at said temporary storage means,
while playing said contents data with said playing unit.

7. The playing state presentation device according to claim 6, wherein said playing state prediction means calculate a prediction time till said contents data stored in said temporary storage means is depleted, by dividing the stored amount of said contents data in said temporary storage means by the difference value between said contents data reception speed by said wireless communication and said supply speed, and predicting said playing state based on said prediction time.

8. The playing state presentation device according to claim 7, wherein said presenting means display said prediction time, as well as said playing state, on a predetermined display unit.

9. The playing state presentation device according to claim 2, wherein, in the event that estimation is made by said playing state prediction means that supply of said contents data as to said playing unit will run out, said presenting means presents a reason why the supply of said contents data will run out, as well as said playing state.

10. A playing state presentation method comprising the steps of:
receiving consecutive contents data from a predetermined contents server by wireless communication;
supplying said contents data to a playing unit which successively plays said contents data received by said reception means, with said contents data being supplied at a supply speed unique to said contents data;
predicting a playing state based on an estimated communication speed ratio, wherein the playing state is an integer number indicative of whether or not said contents data can be continuously played at said playing unit; and
presenting said predicted playing state.

11. A playing state presentation program for causing a playing state presentation device to execute the steps of:
receiving consecutive contents data from a predetermined contents server by wireless communication;
supplying said contents data to a playing unit which successively plays said contents data received by said reception means, with said contents data being supplied at a supply speed unique to said contents data;
predicting a playing state based on an estimated communication speed ratio, wherein the playing state is an integer number indicative of whether or not said contents data can be continuously played at said playing unit; and
presenting said predicted playing state.

12. A playing state presentation system having
a contents server for supplying consecutive contents data, and
a contents playing device for obtaining and playing said contents data;
said contents playing device comprising:
a reception unit for receiving said contents data from said contents server by wireless communication;
a supplying unit for supplying said contents data to a playing unit which successively plays said contents data received by said reception unit, with said contents data being supplied at a supply speed unique to said contents data;
a playing state prediction unit for predicting a playing state based on an estimated communication speed ratio, wherein the playing state is an integer number indicative of whether or not said contents data can be continuously played at said playing unit; and
a presentation unit for presenting said predicted playing state.

13. A playing state presentation device comprising:
a reception unit for receiving consecutive contents data from a predetermined contents server by wireless communication;
a supplying unit for continuously supplying said contents data to a playing unit which successively plays said contents data received by said reception unit, with said contents data being supplied at a supply speed unique to said contents data;
a playing state prediction unit for predicting a playing state based on an estimated communication speed ratio, wherein the playing state is an integer number indicative of whether or not said contents data can be continuously played at said playing unit; and
a presentation unit for presenting said predicted playing state.

* * * * *